United States Patent [19]

Mills et al.

[11] 3,732,154

[45] May 8, 1973

[54] CATALYTIC HYDROFINISHING OF LUBE OIL PRODUCT OF SOLVENT EXTRACTION OF PETROLEUM DISTILLATE

[75] Inventors: Ivor W. Mills, Media; Merritt C. Kirk, Jr., Thornton; Albert T. Olenzak, Media, all of Pa.

[73] Assignee: Sun Oil Company, Philadelphia, Pa.

[22] Filed: Sept. 8, 1970

[21] Appl. No.: 70,590

Related U.S. Application Data

[63] Continuation-in-part of Ser. No. 812,516, Feb. 19, 1969, Pat. No. 3,619,414.

[52] U.S. Cl.............................208/87, 208/14
[51] Int. Cl.........................C10g 23/02, C10g 41/00
[58] Field of Search............................208/14, 18, 87

[56] References Cited

UNITED STATES PATENTS

| 3,369,999 | 2/1968 | Donaldson et al. | 208/264 |
| 3,224,955 | 12/1965 | Anderson | 208/18 |
| 3,232,863 | 2/1966 | Watson et al. | 208/18 |
| 3,403,092 | 9/1968 | Rausch | 208/87 |

FOREIGN PATENTS OR APPLICATIONS 743,525    9/1966    Canada..................................208/14

*Primary Examiner*—Herbert Levine
*Attorney*—George L. Church, Donald R. Johnson, Wilmer E. McCorquodale, Jr. and Barry A. Bisson

[57] ABSTRACT

Hydrofinished petroleum products, useful as lube oils, rubber oils, refrigerator oils, transformer oils, cable oils, ATF and friction drive transmission fluids, etc., can be produced by a process comprising (1) solvent extracting petroleum distillate stock to obtain a raffinate product and an extract product, and (2) contacting at least one of these products with hydrogen, in the presence of a catalyst comprising a hydrogenating component selected from the group consisting of sulfides and oxides of a combination of nickel and at least one Group VIB metal (Cr, Mo, W). Especially preferred metal combinations are (a) nickel and molybdenum, (b) nickel, molybdenum and at least one other iron group metal (e.g., Co) and (c) nickel and tungsten. The preferred petroleum distillate is naphthenic by viscosity-gravity constant classification.

12 Claims, No Drawings

CATALYTIC HYDROFINISHING OF LUBE OIL PRODUCT OF SOLVENT EXTRACTION OF PETROLEUM DISTILLATE

CROSS REFERENCE TO RELATED APPLICATIONS

This application is a continuation-in-part of our application Ser. No. 812,516, filed Feb. 19, 1969 and which issued as U.S. Pat. No. 3,619,414 on Nov. 9, 1971.

This application also claims the benefit, if such is needed, accorded by 35 U.S.C. 120 with respect to the following applications referred to herein; Ser. Nos. 622,398; 636,493; 652,026; 730,999; 733,095; 792,131; 850,716; 850,717; 850,778; 850,779; 873,008; 874,087; 16,495; 22,295; 35,231 and 63,303.

The following patents and applications, are related to the disclosure of the present application in that they disclose hydrofinishing (e.g., hydrorefining) conditions and catalysts which are useful in the process of the present invention. Also disclosed therein are uses for the hydrofinished products. Methods for obtaining lubricating oil boiling range products by solvent extraction of petroleum distillates are well known to the art; however, some of these methods are also disclosed in the following patents and applications, the entire disclosure thereof being hereby incorporated in the present application:

| Ser. No. | Filing Date | Patent No. | Issue Date | Title/Inventor(s) |
|---|---|---|---|---|
| 622,398 | 3-13-67 | 3,462,358 | 8-19-69 | Clay Treatment of Hydrorefined Cable Oils — IVOR W. MILLS & GLENN R. DIMELER |
| 636,493 | 5-5-67 | 3,681,279 | 8-1-72 | Process for Preparing an Aromatic Oil and Non-discoloring Rubber Composition Containing Said Oil IVOR W. MILLS, GLENN R. DIMELER & MERRITT C. KIRK, JR. |
| 652,026 | 7-10-67 | 3,502,567 | 3-24-70 | Process for Producing Cable Oils by Sequential Refining Steps — IVOR W. MILLS & GLENN R. DIMELER |
| 657,438 | 5-29-67 | | | Rubber Containing Acid-treated Oils and Its Preparation — ABRAHAM SCHNEIDER & ARCHIBALD P. STUART |
| 730,999 | 5-22-68 | | | Hydrorefined Transformer Oil and Process of Manufacture — IVOR W. MILLS & GLENN R. DIMELER |
| 733,095 | 5-29-68 | 3,514,395 | 5-26-70 | Process for Producing a High Aromatic, Low Color, UV Stable Process Oil — DONALD R. McVAY, ALBERT T. OLENZAK & SHELDON L. THOMPSON |
| 792,131 | 1-17-69 | 3,699,071 | 10-17-72 | High Modulus Composition Comprising Hydrocarbon Oil, Rubber and Carbon Black — IVOR W. MILLS, GLENN R. DIMELER, MERRITT C. KIRK, JR. & JACKSON S. BOYER |
| 799,499 | 2-14-69 | 3,594,307 | 7-20-71 | Production of High Quality Fuels by Two-Stage Hydrogenation — MERRITT C. KIRK, JR. |
| 812,516 | 2-19-69 | 3,619,414 | 12-9-71 | Catalytic Hydrofinishing of Petroleum Distillates in the Lubricating Oil Boiling Range — IVOR W. MILLS, MERRITT C. KIRK, JR. & ALBERT T. OLENZAK |
| 850,716 | 8-18-69 | now abandoned | | Blended Hydrocarbon Oils an Process of Manufacture — IVOR W. MILLS & GLENN R. DIMELER |
| 850,717 | 8-18-69 | now abandoned | | Hydrorefined Lube Oil and Process of Manufacture — IVOR W. MILLS & GLENN R. DIMELER |
| 850,778 | 8-18-69 | 3,654,127 | 4-14-72 | Process for Preparing High Viscosity Hydrorefined Cable Oil — IVOR W. Mills, GLENN R. DIMELER, WILLIAM A. ATKINSON & DAVID A. HOFFMAN |
| 850,779 | 8-18-69 | 3,586,752 | 6-22-71 | Electrical Conduct Containing Hydrorefined Oil — IVOR W. MILLS, GLENN R. DIMELER & JOHN J. MELCHIORE |
| 873,008 | 10-31-69 | | | Oil and Process of Manufacture of Blended Hydrorefined Oil — IVOR W. MILLS & GLENN R. DIMELER |
| 874,087 | 10-27-69 | | | Light-colored Highly Aromatic Oil and Process of Preparation — IVOR W. MILLS, GLENN R. DIMELER & MERRITT C. KIRK, JR. |
| 16,495 | 3-4-70 | 3,673,078 | 6-27-72 | Process for Producing High UR Oil by Hydrogenation of Dewaxed Raffinate — MERRITT C. KIRK, JR. |
| 22,295 | 3-24-70 | 3,681,233 | 8-1-72 | Hydrorefined Cable Oil and Process of Manufacture — IVOR W. MILLS & GLENN R DIMELER |
| 35,231 | 5-6-70 | | | Hydraulic Oil Composition Containing a Blended Base Stock — JOHN Q. GRIFFITH, III, EDWARD S. Williams, WILLIAM H. REILAND, JR., IVOR W. MILLS |

SUMMARY OF THE INVENTION

This invention relates to single or multiple stage hydrofinishing (which includes hydrogenation, hydrorefining, hydroaromatization) of petroleum distillate in the lubricating oil boiling range (and, especially, of naphthenic distillates boiling mainly above 580°F.). One characteristic of such hydro-finishing is that the product contains at least 50 percent (by weight) less polar aromatic compounds by ASTM D2007, than the feed.

A preferred process for the catalytic hydrofinishing of petroleum distillate involves solvent extraction (with aromatic-selective solvent, such as furfural, phenol, $SO_2$, etc.) prior to the hydrofinishing step and hydrofinishing of at least one product of the extraction. The hydrofinished products are useful in the production of lube oils, rubber oils, refrigerator oils, transformer oils, cable oils, ATF and friction drive transmission fluids, etc. The hydrorefining process comprises contacting an extract or raffinate, of lube oil viscosity (40–12,000 SUS at 100°F.) with hydrogen in the presence of a catalyst comprising a hydrogenating component selected from the group consisting of sulfides and oxides of a combination of nickel and at least one Group VIB metal. Especially preferred combinations are (a) nickel-molybdenum or (b) nickel-molybdenum and at least one other iron group metal (e.g. Co, Fe, W) or (c) a combination of nickel and tungsten. The preferred distillate is naphthenic. Preferably, the hydrogenating component is composited with an inorganic oxide support (preferably refractory) such as silica or alumina, and the contacting carried out at an average catalyst temperature of about 500°–800°F., LHSV of 0.1–8.0 (based on the fresh feed) with from 500–3,000 p.s.i. of hydrogen entering the reactor. The combination of conditions is so selected as to effect either hydrogenation, "autofining" (i.e., removal of polar aromatics with little or no net change in the total weight percent aromatics) or dehydrogenation, but with no substantial cracking to hydrocarbons boiling below the lube oil range (generally, less than 10 volume percent of the product boils below 550°F.). Gas (e.g. hydrogen) recycle can be from 0–20,000 SCF/BB1.

Clay finishing of the catalytically hydrofinished product can be advantageous where it is desired to have such additional improvement as low initial dissipation factor (IDF) or lighter initial color. The Clay finishing can utilize acid activated adsorbent clay (e.g., see U.S. Pat. No. 3,462,358 and the previously cited application of Mills and Melchiore filed on or about Aug. 12, 1970).

Where the charge stock to the hydrofinishing step is highly aromatic (such as heavy aromatic extracts obtained by extraction of aromatic or naphthenic distillate oils with an aromatic-selective solvent or with a Lewis acid), temperatures as low as 450°F. and pressures as low as 500 p.s.i.g. can be used to obtain a satisfactory decrease in the ultraviolet absorptivity at 260 millimicrons; however, the preferred conditions include a temperature of at least 650°F. (typically, 650°–680°F.) and pressures of at least 800 p.s.i. of hydrogen (typically 1,200–3,000 p.s.i.) and wherein the hydrogen is from 50–100 percent pure (typically "reformer" hydrogen of 65–85 percent purity).

One aspect of the invention involves preparing an aromatic hydrocarbon fluid having a reduced tendency to discolor upon aging (e.g., as in the presence of ultraviolet light) and which is useful as a rubber processing oil. Such a fluid can be prepared by a one or two-step hydro-aromatization process wherein the feed is a raffinate or extract of a naphthenic distillate boiling mainly above 580°F., said feed having a viscosity in the range of 40–10,000 SUS at 100°F. and containing non-hydrocarbon impurities comprising organic heterocyclic sulfur and nitrogen compounds and containing no more than 40 percent aromatic hydrocarbons, if a raffinate, and in the range of 25% to 85 percent aromatics, if an extract. For such hydroaromatization, the preferred hydrogen partial pressure is in the range of 500–1,000 p.s.i. and the preferred temperature is in the range of 725°–765°F. (e.g., about 750°F.), the liquid hourly space velocity being typically in the range of 0.1–5.

One aspect of the invention involves a process for producing electrical grade oils (e.g., cable oils, transformer oils) comprising contacting a furfural raffinate of a naphthenic distillate (said raffinate and said distillate having a viscosity in the range of 40–10,000 SUS at 100°F.) with hydrogen and a nickel-containing catalyst from one of the aforementioned classes, preferably under hydrogenation conditions selected as to effect appreciable hydrogen consumption but no substantial cracking and contacting the resulting hydrorefined oil with clay. Similarly, a single stage hydrogenation can be used to prepare a refrigerator oil from a furfural extract of a naphthenic distillate, as by using a catalyst comprising Ni-W on $Al_2O_3$.

Another aspect of this invention relates to the removal, by the present hydrofinishing process, of nitrogen and sulfur and the saturation of the aromatics in the raffinate or extract product from a naphthenic or paraffinic distillate to less than 2 weight percent preferably, less than 1 percent, typically 0.0–0.5%) to prepare a useful fluid in toric or friction drive transmissions (i.e., a "traction fluid," see the commonly assigned copending application Ser. No. 679,833 of Irl N. Duling and David S. Gates, filed Nov. 1, 1967, the disclosure of which is hereby incorporated herein).

A process for producing lubricating oil stocks of improved stability comprises solvent extracting a lubricating oil distillate stock and contacting a product of the extraction with hydrogen, (under the conditions referred to herein) in the presence of a catalyst comprising a hydrogenating component selected from the group consisting of sulfides and oxides of (a) a combination of molybdenum (e.g, $MoS_2$), molybdenum and at least one iron group metal (e.g., $CoMoS_x$, $NiMoS_x$) and another iron group metal, or molybdenum and at least two iron group metals $NiCoMoS_x$) and (b) a combination of nickel and tungsten (e.g., NiW). However, of these combinations, the hydrofinishing (at a given average bed temperature, hydrogen pressure, recycle rate and space velocity,) is superior when the combination comprises nickel and a Group VIB metal.

The preferred catalysts comprise combinations of nickel and molybdenum; nickel, cobalt and molybdenum; and nickel-tungsten. For hydroaromatization, combinations of nickel and chromium can be useful. The catalyst metal is preferably in sulfide form and preferably is on a support which has low hydrocracing activity (e.g., silica, alpha alumina, bauxite), the contacting being carried out at an average catalyst temperature of about 500°F. to 800°F. (e.g., 575°–750°F.) at a liquid hourly space velocity (LHSV) in the range of 0.1–8.0 (e.g., about 0.5–4 liquid volumes of oil per volume of catalyst per hour) and a pressure of about 500–3,000 p.s.i.g. of hydrogen at the reactor inlet. The combination of conditions can be so selected as to effect appreciable hydrogen consumption but no substantial cracking or, the conditions can be selected so as to utilize little or no added hydrogen (e.g., autofining) or can be selected so as to cause a net production of hydrogen (e.g., hydroaromatization).

For many oils, the additional improvement imparted by clay treatment of the hydrorefined product can be justified economically. Such oils include the electrical oils, refrigerator oils, highly aromatic plasticizers for rubber or vinyl (e.g., those containing at least 45 percent of aromatics), and traction fluids.

As has been shown in the previously referred to copending application of Mills and Dimeler, Ser. No. 622,398, it is sometimes advantageous in the clay finishing of electrical oils, such as cable oils, to utilize a critical dosage of an acid-activated clay or a combination of acid-activated clay and attapulgite in order to obtain the desired electrical characteristics. The catalyst and hydrogenation conditions disclosed in said Ser. No. 622,398 are useful in practice of the present invention when it is desired to produce an electrical oil or a refrigeration oil. Also useful are the adsorbent admixtures (and process conditions) disclosed in U.S. Pat. No. 3,369,999 for the decolorizing of waxes.

The above-identified application Ser. No. 636,493, filed May 5, 1967, discloses that hydrorefining of "1300 SUS furfural raffinate of a 2400 SUS naphthenic distillate" produced a refined oil which had a low content polar aromatics, was light-colored, had good ultraviolet stability, and was useful as a plasticizer or extender for light-colored rubber vulcanizate.

The above-identified application Ser. No. 733,095, filed May 29, 1968, now U.S. Pat. No. 3,514,395, discloses a method for producing high aromatic oils which are stable to ultraviolet light and have low color characteristics which comprises subjecting a highly aromatic extract stream of a reduced crude oil feed to a mild hydrogenation process in the presence of a hydrogenation catalyst at a temperature in the range of 400° to 675°F., a hydrogen pressure of 200 to 1,500 p.s.i., and a liquid hourly space velocity of 0.1 to 5.0 per hour, and thereafter selectively solvent-treating the hydrogenated base stock at a temperature in the range of 60° to 120°F. and a solvent dosage of 50 to 300 percent with selective solvent for aromatics. The preferred catalyst disclosed for this process is nickel-molybdenum on an alumina support, presulfided with 10 percent hydrogen sulfide in hydrogen.

The above-identified application Ser. No. 812,516, filed Feb. 19, 1969, (of which the present application is a continuation-in-part) discloses a process for producing lubricating oil stocks of improved stability comprising contacting a lubricating oil distillate stock with hydrogen, in the presence of a catalyst comprising a hydrogenating component selected from the group consisting of sulfides and oxides of molybdenum and at least two iron group metals and (b) a combination of nickel and tungsten, said contacting being carried out at a temperature of about 500°–800°F., at a space velocity of about 0.1–8.0 liquid volumes of oil per volume of catalyst per hour based on the fresh feed, and at a pressure of about 500–3,000 p.s.i. of hydrogen, the combination of conditions being so selected as to effect appreciable hydrogen consumption but no substantial cracking, and wherein said lubricating oil distillate stock is extracted with an aromatic selective solvent prior to said hydrogenation. Also disclosed is a process wherein the more highly aromatic extract from said extraction is hydrogenated. For hydrogenation (i.e. saturation or partial saturation) of aromatic components of the feed (particularly, of an extract) the temperature can be in the range of 575°–700°F. (more preferred 625°–680°F., most preferred about 650°F.) and the hydrogen partial pressure is preferably in the range of 800–3,000 p.s.i. For aromatization (as of a raffinate from furfural extraction of a naphthenic distillate) the temperature can be in the range of 685–765; however, the preferred temperature is in the range of 725°–765°F. (more preferred about 750°F.) and the hydrogen partial pressure is preferably maintained in the range of 500–1,500 p.s.i. Depending on the pressure, space, velocity and the nature of the extract or raffinate which is being hydrofinished, temperatures in the range of 685°–725°F. can effect a net hydrogenation of aromatics (e.g., the net consumption of hydrogen can be 150 SCF/BBl. and up) no hydrogenation, or a net dehydrogenation of naphthenes (i.e., hydroaromatization). The data in copending application Ser. No. 636,493 (for naphthenic distillate feed) are illustrative of this phenomenon. The extraction can be conducted "hot" or "cold" (see U.S. Pat. No. 3,514,395 to McVay, Olenzak and Thompson).

When the catalyst comprises a combination of nickel, molybdenum, and at least one other iron group metal, the catalyst can contain from about 2 to 25 weight percent of molybdenum and the ratio of each iron group metal to molybdenum can be less than about 0.4 (for example, Filtrol 500-8, which is NiCoMo on $Al_2O_3$). However, other nickel and molybdenum containing catalysts which also contain at least one other iron group metal can be used in the present invention. For example, the NiCoMo catalyst which is available commercially from Universal Oil Products Corporation under the designation S–6 and analyzing 0.5–1 percent Co, about 3% Ni and about 7% Mo, on $Al_2O_3$, is particularly useful in the production of a transformer oil. Other useful catalysts are those in U.S. Pat. No. 3,424,673, *I & E CHEM.*, 51 (No. 11), pages 1349–1350, (November, 1959), and in the previously referred to copending applications of Mills et al., for example.

As has been long known in the art (e.g., see U.S. Pat. No. 2,726,193 of Docksey et al.) a usual (and useful) processing technique in conjunction with hydrogenations which effect hydrodesulfurization of petroleum stocks is to "flash-off" the $H_2S$ produced (which can, in part, be dissolved in the oil).

In the production of an electrical oil, the conditions, catalysts and processing techniques disclosed in the previously referred to copending application, Ser. No. 730,999 can also be of advantage in the present invention. Similarly, the techniques, including the acid-treatment, of previously referred to copending application, Ser. No. 652,026 can also be useful in the present invention. Such acid treatment (or treatment with an acidic clay) aids in reducing the content of "basic" nitrogen in the final product oil. Other catalysts which can be of use in the production of hydrorefined 40-10,000 SUS oils are those disclosed in copending application of Merritt C. Kirk, Jr., Ser. No. 799,399.

In oxide form, the catalysts can also contain $Fe_3O_4$ or CuO prior to sulfiding in addition to Ni, Ni and Mo, Ni and Cr, Ni and W, or Ni, Mo and Co (these metals can be present either as the metal and/or an oxide prior to the sulfiding).

Product recycle, for example, as in U.S. Pat. No. 2,900,433, can be used, preferably at a product to feed fresh ratio below 10:1 (more preferably, 8:1 to 1:1). Preferably, the reaction conditions (particularly the temperature) are chosen such that no substantial cracking occurs; that is, no more than 20 percent (preferably less than 10 percent) of the feed stock is converted to material boiling below 300°F. (more preferred, no more than 10 volume percent of the product boils below 550°F.).

Although the maximum hydrorefining or hydro-aromatization temperature which will not produce substantial cracking is somewhat dependent upon the space velocity, the type of catalyst and the pressure, generally it is below 750°F. For severe hydrorefining under conditions where the gel aromatic content of the original feed stock is not substantially increased but hwere the 335 UVA is sufficiently great to impart reasonable oxidation stability to the product, the preferred conditions include a temperature in the range of 650°-680°F. Preferred hydrogen pressures at the reactor inlet are in the range of 800-3,000 p.s.i. (wherein the hydrogen is from 50-100 percent pure) and, more preferably, a hydrogen pressure at the reactor inlet in the range of 1,200-3,000 p.s.i. In the usual fixed bed hydrogenation reactor, the purity of the hydrogen, and, thus, the partial pressure exerted by the hydrogen, decreases as the gas moves through the bed and hydrogen is consumed. Therefore, we prefer to refer to the hydrogen pressure in our process in terms of the partial pressure of the hydrogen at the reactor inlet, in order that at least some of the feed is insured contact with a specified minimum concentration of hydrogen.

Typical of severe hydrorefining methods which can be used in our process when conducted within the processing conditions referred to herein are those of U.S. Pat. Nos. 2,968,614; 2,993,855; 3,012,963; 3,114,701; 3,144,404 and 3,278,420.

Typical catalysts are nickel molybdenum oxide, nickel-chronium oxide, nickel-chromium-molybdenum oxide, cobalt-nickel-molybdenum oxide and tungsten-nickel-molybdenum oxide. Preferably they are on a carrier such as silica, alumina, alumina-titania and alumino-silicates (either crystalline or amorphous). When the carrier is an alumino-silicate which has acid (cracking) activity, the reaction conditions are preferably controlled so as to avoid excessive hydrocracking. These metal-oxide catalyst combinations are preferably presulfided (as by contacting with $H_2S$, $CS_2$, etc.) before use in the subject hydrofinishing process. Nickel-chromium sulfide, nickel-molybdenum sulfide, nickel-molybdenum sulfide, nickel-tungsten sulfide and nickel-chromium-molybdenum sulfide, per se or on a carrier, can also be used as catalysts. Examples of operable catalysts are those of U.S. Pat. Nos. 2,744,052; 2,758,957; 3,053,706; 3,182,016; 3,205,165; 3,227,646; and 3,264,211.

One process for producing good yields of transformer grade oils having good response to DBPC additive and good stability comprises contacting a naphthenic distillate oil with hot furfural (e.g., 190°F., 170 percent) to produce a raffinate have an aromatics content less than 30 percent (e.g., no greater than 25 percent), an alkanes content not greater than 5 percent, the balance being substantially all naphthenes, and having a flash point not less than 275°F., a viscosity at 100°F. of about 50 to 85 SUS, and a viscosity at 32+F. of not more than about 280 SUS, and contacting this raffinate with about 500 to 4,000 SCF/BBl of a hydrogen-containing gas containing at least 60 percent hydrogen with a catalyst comprising a hydrogenating component selected from the group consisting of sulfides and oxides of (a) nickel and molybdenum, (b) a combination of about 4 to 16 percent by weight molybdenum and nickel and at least one other iron group metal, where nickel and the other iron group metal are present in such amounts that the ratio of each iron group metal to molybdenum is less than about 0.4, and (b) a combination of about 10 to 25 percent by weight of nickel and tungsten where the atomic ratio of tungsten to nickel is about 1:03 to 4, said hydrogenating component being composited with an alumina support, said contacting being carried out at an average catalyst temperature of about 575°-645°F., at a space velocity of about 0.25 to 3 liquid volumes of oil per volume of catalyst per hour, and at a pressure of about 1,000 to 1,800 p.s.i.g., (with 80 to 100 percent hydrogen) the combination of conditions being so selected as to effect appreciable hydrogen consumption but no substantial cracking, stripping the hydrogenated oil at a temperature of about 325°-600°F. to remove hydrogen sulfide, and clay treating the stripped hydrogenated oil in a proportion not exceeding about 250 barrels of oil per ton of clay.

EXAMPLE I

A naphthenic distillate in the transformer oil boiling range is contacted with hot furfural and the raffinate product hydrogenated over presulfided UOP S-6 catalyst at a temperature of 680°F., 1500 p.s.i.g. of pure hydrogen, at an LHSV of 0.4 and a hydrogen/oil ratio of 4-5 moles/mole. to product a hydrorefined oil which is greatly reduced in polycyclic aromatic compounds and which contains less sulfur and gel aromatics than did the original charge stock. The hydrorefined oil has a Doble life of about 1 day. After contacting with a clay (e.g., 5-40 lbs. of attapulgite per BBl. of oil) such an electrical oil can have a Doble life in the order of 2 to 3 days (see U.S. Pat. No. 3,406,111 for a description of the Doble test). Table I shows typical results which can be obtained by such a hydrorefining with Ni-Co-Mo catalyst.

TABLE I

| Stock | Charge | Hydrofinished Product |
|---|---|---|
| Aromatics by silica gel, wt. % | 37.7 | 23.6 |
| Monocyclic aromatics | 24.5 | 22.5 |
| Dicyclic aromatics | 11.6 | 1.0 |
| Tricyclic aromatics | 1.6 | 0.1 |
| Sulfur, wt. % | 0.19 | 0.03 |
| Nitrogen, ppm | 63 | 1 |

These data indicate that at these conditions UOP-S-6 has a fairly good activity for hydrogenation of monocyclic aromatics. Similar degrees of hydrogenation can be obtained with raffinates containing a lower wt. % aromatic (e.g., 25 percent).

The above-referred to copending application, Ser. No. 730,999 discloses, in detail, the effect upon the properties of the resulting transformer oil (especially regarding the 335 UVA, gel aromatics and sulfur and nitrogen removal) when such hydrogenations are conducted at temperatures in the range of about 500°–800°F. (and at pressures above 800 p.s.i. of $H_2$). The teachings of that application can be used with raffinates from naphthenic distillates to "tailor-make" transformer oils, having particular desired combinations of oxidation stability and impulse breakdown strength. To minimize the ultraviolet absorptivity at 335 millimicrons (i.e., 335 UVA), a preferred temperature range is about 575°–645°F. (600°F. being about the minimum point), such low 335 UVA and low nitrogen content transformer oils have good response to the usual oxidation inhibitors used in transformer oils. However, when it is desired that the uninhibited oil have a long sludge-free life under the Doble test conditions, the hydrorefining conditions should be such as to both lower the nitrogen to less than 25 p.p.m. (preferably less than 15 p.p.m.) and also to increase the 335 UVA to greater than 0.04 (preferably at least 0.06). Such low nitrogen and relatively high 335 UVA in a hydrorefined transformer oil can be obtained in the present process when at least one portion of hydrogenation includes temperatures greater than 680°F. (e.g., 685°–765°F.) in order to effect a minor degree of hydro-aromatization.

Hydrorefined oils having viscosities in the range of 40–2,000 SUS at 100°F., nitrogen below 25 p.p.m. and a 335UVA greater than 0.04 can also be useful as coolants for a nuclear reactor since they have good stability when exposed to nuclear radiation.

The S-6 catalyst and other NiCoMo catalysts are also useful for desulfurization and hydrogenation of crude oils (such as Lagomedio at 750°F., 1500 p.s.i.g. of $H_2$, 0.1–2 LHSV, 0–10,000 SCF/BBl recycle). Such a crude hydrogenation can be an economical means of utilizing natural gas (to produce hydrogen) which otherwise would have little value (as can be the case where a locality has no gas pipeline).

Another useful catalyst (preferably presulfided), in the production of electrical oils, is Ni-Mo, such as that which is available under the tradename Aero HDS-3 (3% NiO and 15% $MoO_3$), or Aero HDS-3A, which is the same composition in a smaller particle size. Additional advantage is found when such a catalyst as HDS-3 or HDS-3A is impregnated with additional Ni (as to produce a catalyst analyzing from 5–20% Ni in the oxide form).

For highly aromatic charge stocks (e.g., having a 260 UVA greater than 80 ), lower hydrogen pressures can be used, particularly with a catalyst containing Ni and Mo or Ni, Co and Mo, to successfully reduce the 260 UVA. For example, with NiCoMo (Filtrol 500–8) at 500 p.s.i.g. of pure hydrogen, an LHSV of 0.5 and a gas recycle of 4,000 SCF/BBl, an aromatic oil having a 260 UVA of 114 can be reduced to a UVA of 52 at a contact temperature of 600°F., to about 68 at 625°–650°F.

Examples of the preparation of cable oils (having, for example, viscosities greater than 500 SUS at 100°F. and a 260 UVA less than 8), can be found in the previously referred to applications, Ser. Nos. 622,398 and 636,493. For example, after clay treatment, a hydrogenated cable oil, produced from a hydrorefined raffinate, can have a viscosity greater than 2,000 SUS at 100°F., an IDF less than 0.001 and an ADF less than 0.01. Ser. No. 652,026, discloses that it is sometimes advantageous to contact a product of solvent extraction with a Lewis acid prior to hydrorefining.

Ser. No. 652,026 further discloses that any of the well known selective solvents for aromatics can be employed, e.g., furfural, phenol, sulfur dioxide, nitrobenzene, B,B'dichloroethyl ether, etc. Temperatures of 100° to 250°F. and solvent-to-oil ratios of 1–4:1 are preferred. Extract yield is usually 10 to 30 weight percent of charge. Other conditions and yields are contemplated in some cases. Highly aromatic non-discoloring rubber process oils (e.g., 45–90 percent aromatics) can be prepared from such extracts by a sufficiently severe acid-treatment to reduce the polar aromatic content of the product oil to less than 3 percent or by hydrorefining under conditions such that the aromatic content of the oil is essentially maintained, or is increased (as by hydro-aromatization).

Ser. No. 654,026 discloses that frequently a combination of solvent extraction and acid treatment is less expensive than the use of acid treatment alone to produce a neutral oil of given aromaticity and polar content, because the more aromatic oil recovered from a solvent extract has a better market value than the residue from acid refining. For example, solvent extraction can generally be used to decrease acid consumption by about 50 percent. Such a combined process allows the production (from the raffinate) of a less polar oil of given aromatic content than can be produced solely by extraction with an aromatic selective solvent, such as furfural, $SO_2$ or phenol. Ser. No. 652,028 further discloses that it is sometimes also economically advantageous to acid treat a hydrorefined or hydrotreated naphthenic distillate (or a furfural raffinate of such a distillate) since such a hydrogenation step will appreciably reduce the sulfur and nitrogen content of the charge, and, thus, decrease acid consumption.

Ser. No. 652,026 discloses that, in the making of low ADF hydrofinished, high viscosity cable oil, solvent extraction, however, cannot be a complete substitute for acid-treatment since it is characteristic of extraction with an aromatic selective solvent (within the ranges of temperature and solvent-to-oil ratio practiced by the prior art) that the solvent extracts the desirable aromatic hydrocarbons along with the undesirable polar aromatic compounds. After a given degree of aromatic removal has been obtained by solvent extraction, further extraction results in a more selective removal of the desirable aromatic hydrocarbons from the raffinate and the relative polar aromatic content of the refined raffinate oil will not decrease. In fact, in such a "deeper" raffinate, the ratio of polar aromatics to total aromatics can increase.

For example, furfural extraction of a 2,400 SUS (at 100°F.) distillate containing 47.5 percent aromatics (260 UVA of 11) and 2.7 percent polar compounds can produce a 1200 SUS oil containing 31.6 percent aromatics (260 UVA of 2.5 and 1.0 percent polar compounds. A second extraction of this product (or a more deep initial extraction of the distillate) produces a 1,000 SUS oil containing 22.5 percent aromatics (260 UVA of 1.0 ) and 1.0 percent polar aromatics.

In contrast, when the 31.6 percent aromatic content raffinate is treated with 10 lbs. of HF per 100 lbs. of oil, the resulting neutral oil contains 31.2 percent aromatics and 0.5 percent polar compounds. When this acid-treated, furfural raffinate is hydrorefined and contacted with bauxite, the resulting cable oil has an ADF that is at least as low as the exhibited by commercially available polybutene oils of the same viscosity.

Examples of the preparation of rubber oils (either of low 260 UVA and aromaticity or of high 260 UVA and aromaticity) can be found in the previously referred to application Ser. No. 636,493.

Such oils are useful as plasticizers in rubber (especially in EPDM). Clay treatment (as with 10–200 lb. attapulgite per BBl of oil) can improve at treating temperatures above 650°F. (and which contain less than 2 percent of polar compounds) are preferred for use in butyl rubbers, ethylene propylene rubbers and EPDM rubbers, since such rubber oil compositions (especially when they also contain carbon black) have improved tensile strength and modulus.

EXAMPLE II

Two portions of an aromatic extract charge stock obtained by furfural extraction of a naphthenic acid-free naphthenic distillate were contacted at 625° and 650°F., respectively, with an NiW on $Al_2O_3$ catalyst (available commercially as Harshaw Ni 440 3) at 1,800 p.s.i.g. of pure hydrogen at an LHSV of 0.5 and with a gas recycle of 5,000 SCF/BBl. The properties of the resulting hydrogenated oils, which were useful as refrigerator oils, are shown in Table II below:

TABLE II

| Product Data | Charge Stock | Product Temperature of Contact 625°F. | 650°F. |
|---|---|---|---|
| UVA at 260 mu | 3.2 | 0.3 | 0.16 |
| Wt. % Aromatics | 34.7 | 18.7 | 10.7 |
| Ref. Index | 1.4998 | 1.4854 | 1.4836 |
| Viscosity, 210°F. | 41.2 | 38.0 | 38.2 |
| Viscosity, 100°F. | 158.3 | 96.1 | 102.5 |
| Vacuum Boiling Range Volume %, °F at 2 mm Hg | | | |
| ibp | 222 | 146 | 122 |
| 5 | 284 | 265 | 240 |
| 10 | 308 | 302 | 280 |
| 30 | 354 | 350 | 342 |
| 50 | 378 | 377 | 370 |
| 70 | 405 | 405 | 398 |
| 90 | 446 | 457 | 438 |
| 95 | 470 | — | 462 |
| EP | 475 | 475 | 465 |

When corrected to one atmosphere, 240°F. at 2 mm corresponds to 548°F. and 280°F. corresponds to 599°F.; therefore, the hydrogenation at 650°F. produced less than 5 percent of materials boiling below 550°F., showing that there was no substantial cracking in the hydrofinishing steps. Clay treatment, with attapulgite, can be used to improve the initial color of such hydrogenated refrigerator oil. Contacting with admixtures of acid-activated clay and attapulgite (5–40 lb./BBl. of a mixture containing 75 wt. % attapulgite) also improves the stability of the oil during use.

EXAMPLE III

A naphthenic distillate in the transformer oil boiling range was contacted with hot furfural and separate portions of the raffinate product were hydrogenated over presulfided Aero HDS-3 catalyst at temperatures of 700°, 725° and 750°F., respectively. Other conditions for each run were 500 p.s.i.g. of pure hydrogen, at an LHSV of 1.0 and a gas recycle of 5000 SCF/BBl. Compared to the raffinate charge, the product of each run contained much less sulfur and nitrogen than did the original charge stock. Table III reports analytical data on the products obtained at each hydrorefining temperature.

TABLE III

HYDROFINISHING OF RAFFINATE FROM NAPHTHENIC DISTILLATE

Catalyst: Cynamid Aero HDS-3, ⅝ inch, 500cc, 319gm.

| Operating Conditions | | | |
|---|---|---|---|
| Temperature, °F. | 700 | 725 | 750 |
| Total Pressure, psig. | 500 → | | |
| LHSV, v./hr./v. | 1.0 → | | |
| Gas Recycle, SCF/B | 5,000 → | | |
| Make Up Gas, mol. % $H_2$ | 100 → | | |
| Product Data | Raffinate Charge | | |
| Aromatics, wt. % | | | |
| Mono. | 26.8 | 28.1 | 29.2 | 29.2 |
| Dycyclic | 8.5 | 5.2 | 6.2 | 8.3 |
| Tricyclic | 0.3 | 1.0 | 1.0 | 2.0 |
| Total | 35.6 | 34.3 | 36.4 | 39.5 |
| Total Nitrogen, ppm[1] | 27 | 11 | 11 | .7 |
| Oxygen, ppm | | | | |
| Sulfur, ppm | 1,100–1,700 | 6–16 | 21–24 | 11–19 |

This example shows that in the temperature range of 700°–750°F., our hydrofinishing process can be used to produce a hydrofinished product containing a lower weight percent aromatics than the feed (e.g., at 700°F.) or can be used to produce a hydrofinished product having about the same total weight percent of aromatics (e.g., at a temperature between 700° and 725°F.) or can be used to produce a hydrofinished product having a total weight percent aromatics *greater* than that of the feed stock (e.g., by hydroaromatization at a temperature of 725°F. or greater).

When the hydrofinishing of this example was done at 775°F., hydrogen was produced at a sufficient rate to cause the unit pressure to increase as the run proceeded; however, the 750°F. product was preferred since it contained less products boiling below 550°F.

The invention claimed is:

1. Process for producing improved lubricating oil stocks comprising contacting hydrogen with a raffinate product of a lubricating oil distillate stock which has been extracted with an aromatic selective solvent prior to said contacting and wherein there is also present a hydrogenating component selected from the group consisting of sulfides and oxides of a combination of molybdenum, nickel and cobalt, said hydrogenating component being composited with an alumina support, said contacting being carried out at an average catalyst temperature of about 650°–680°F, at a space velocity of about 0.1 to 4 liquid volumes of oil per volume of catalyst per hour, and at a pressure of about 500 to 3,000 psig, the combination of conditions being selected so as to effect appreciable hydrogen consumption but no substantial cracking.

2. Process according to claim 1 wherein the hydrogenated oil product is clay treated.

3. The process of claim 2 wherein the hydrogenating component is a sulfided combination of nickel, cobalt and molybdenum.

4. The process of claim 2 wherein said contacting is carried out at an average catalyst temperature of about 680°F.

5. The process of claim 4 wherein the hydrogenating component is a sulfided combination of nickel, cobalt and molybdenum.

6. The process of claim 1 wherein the hydrogenating component is a sulfided combination of nickel, cobalt, and molybdenum.

7. A process for producing an electrical oil, a rubber oil or a refrigerator oil comprising contacting a raffinate product from extraction of a naphthenic distillate stock with an aromatic selective solvent, said product having a viscosity in the range of 40–10,000 SUS at 100°F, with hydrogen in the presence of a catalyst selected from the group consisting of oxides or sulfides of a combination of cobalt, molybdenum and nickel said contacting being carried out at a temperature of about 650°–680°F, an LHSV of 0.1–8.0, a pressure at the reactor inlet of 800–3,000 psi of hydrogen, the combination of conditions being selected so as to effect appreciable hydrogen consumption but no substantial cracking and clay treating the hydrogenated oil.

8. A process for hydrofinishing petroleum distillate in the 40–12,000 SUS viscosity range comprising (1) solvent extracting said petroleum distillate to obtain a less aromatic raffinate product and a more aromatic extract and (2) contacting at least said raffinate product with hydrogen, in the presence of a catalyst comprising a hydrogenating component selected from the group consisting of sulfides and oxides of a combination of cobalt, nickel and molybdenum, said contacting being carried out at an average catalyst temperature of about 650°–680°F and with at least 500 psi of hydrogen, the combination of conditions being selected as to effect appreciable hydrofinishing but no substantial cracking.

9. A process according to claim 8 wherein said hydrorefined product is contacted with an acid-activated adsorbent clay.

10. Process according to claim 8 wherein the hydrogen pressure at the reactor inlet is in the range of 1,200–3,000 p.s.i.

11. Process according to claim 1 wherein said contacting is carried out at an inlet hydrogen pressure of from 800–3,000 p.s.i. and wherein the hydrogen entering the reactor is from 50 to 100 percent pure.

12. Process of claim 1 wherein said catalyst consists essentially of oxides or sulfides of molybdenum, nickel and cobalt.

* * * * *